(12) United States Patent
Nagatomo et al.

(10) Patent No.: US 11,467,990 B2
(45) Date of Patent: Oct. 11, 2022

(54) PROGRAMMABLE LOGIC CONTROLLER, EXTERNAL APPARATUS, METHOD, AND RECORDING MEDIUM

(71) Applicant: Mitsubishi Electric Corporation, Tokyo (JP)

(72) Inventors: Yoshihiro Nagatomo, Nagoya (JP); Keiichi Adachi, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/265,212

(22) PCT Filed: Oct. 15, 2018

(86) PCT No.: PCT/JP2018/038262
§ 371 (c)(1),
(2) Date: Feb. 2, 2021

(87) PCT Pub. No.: WO2020/079720
PCT Pub. Date: Apr. 23, 2020

(65) Prior Publication Data
US 2021/0303487 A1  Sep. 30, 2021

(51) Int. Cl.
*G06F 13/16* (2006.01)
*G06F 3/06* (2006.01)
*G05B 19/05* (2006.01)

(52) U.S. Cl.
CPC ........ *G06F 13/1668* (2013.01); *G06F 3/0602* (2013.01); *G06F 3/0659* (2013.01); *G06F 3/0679* (2013.01)

(58) Field of Classification Search
CPC .. G06F 3/0604; G06F 3/0632; G05B 19/0426
See application file for complete search history.

(56) References Cited

U.S. PATENT DOCUMENTS 10,037,303 B2    7/2018  Nixon et al.
2012/0239201 A1*  9/2012  Kobayashi ........... G05B 19/056
                                              700/275
(Continued)

FOREIGN PATENT DOCUMENTS

CN    103314334 B    3/2016
CN    103403633 B    8/2016
(Continued)

OTHER PUBLICATIONS

International Search Report and Written Opinion dated Jan. 15, 2019, received for PCT Application PCT/JP2018/038262, Filed on Oct. 15, 2018, 8 pages including English Translation.
(Continued)

*Primary Examiner* — Getente A Yimer
(74) *Attorney, Agent, or Firm* — Xsensus LLP (57) ABSTRACT

A programmable logic controller performs execution of a program in each set period and repeats the execution of the program. The first device storage stores a device value that is an input value and an output value of the program. The second device storage stores the device value stored in the first device storage in a previous period. In a case in which a reading target preset for a device designated by a monitor request received from an engineering tool is the first device storage, the command processor reads the device value stored in the first device storage after execution of the program in a current period is completed, and in a case in which the reading target is the second device storage, the command processor immediately reads the device value stored in the second device storage. The command transmission/reception element transmits the device value to the engineering tool.

11 Claims, 9 Drawing Sheets

(56) References Cited

U.S. PATENT DOCUMENTS

| | | |
|---|---|---|
| 2012/0290775 A1 | 11/2012 | Ichioka |
| 2013/0116801 A1 | 5/2013 | Chu et al. |
| 2013/0304402 A1 | 11/2013 | Ukena et al. |
| 2014/0012402 A1* | 1/2014 | Nishiyama .......... G05B 19/0426 700/86 |
| 2016/0170398 A1 | 6/2016 | Yoshikawa |
| 2016/0179392 A1* | 6/2016 | Suto .................... G06F 11/3485 711/103 |
| 2016/0217770 A1* | 7/2016 | Kang .................. G06F 3/04817 |
| 2018/0071515 A1* | 3/2018 | Weiss ........................ A61N 1/36 |
| 2018/0210407 A1 | 7/2018 | Namie et al. |
| 2018/0224809 A1 | 8/2018 | Liu et al. |
| 2018/0246502 A1 | 8/2018 | Meier et al. |

FOREIGN PATENT DOCUMENTS

| | | |
|---|---|---|
| CN | 108345270 A | 7/2018 |
| DE | 69127812 T2 | 1/1998 |
| EP | 0522055 B1 | 10/1997 |
| JP | 2001-282319 A | 10/2001 |
| JP | 2003-84811 A | 3/2003 |
| JP | 2004-199670 A | 7/2004 |
| JP | 2004-272629 A | 9/2004 |
| JP | 2007-280377 A | 10/2007 |
| JP | 2009-301359 A | 12/2009 |
| JP | 2015-141648 A | 8/2015 |
| JP | 2016-105957 A | 6/2016 |
| JP | 2016-110458 A | 6/2016 |
| JP | 2017-79009 A | 4/2017 |
| JP | 2018-22288 A | 2/2018 |
| TW | 201319770 A1 | 5/2013 |
| TW | I439829 B | 6/2014 |
| WO | 2015/140910 A1 | 9/2015 |

OTHER PUBLICATIONS

Taiwanese Office Action dated Jul. 5, 2019, received for TW Application 108116835, 18 pages including English Translation.

Decision to Grant a Patent dated Jun. 25, 2019, received for JP Application 2019-519774, 5 pages including English Translation.

Office Action dated Oct. 27, 2021, in corresponding Chinese patent Application No. 201880098607.4, 9 pages.

Office Action dated Feb. 9, 2022, in corresponding German patent Application No. 11 2018 007 978.3, 16 pages.

* cited by examiner

READING TARGET DESIGNATION TABLE

| DEVICE | STARTING NUMBER | FINISHING NUMBER | READING TARGET |
|---|---|---|---|
| X | 1 | 250 | SECOND DEVICE STORAGE |
| X | 251 | 1000 | FIRST DEVICE STORAGE |
| X | 1001 | 1500 | SECOND DEVICE STORAGE |
| Y | 200 | 400 | FIRST DEVICE STORAGE |
| Y | 800 | 2500 | FIRST DEVICE STORAGE |
| D | 1 | 1000 | SECOND DEVICE STORAGE |
| D | 1001 | 1200 | FIRST DEVICE STORAGE |
| ... | ... | ... | ... |

FIG.4

| DESIGNATION OF READING TARGET |
|---|

Designate device, starting number, finishing number, and reading target

| Device | Starting number | Finishing number | Reading target |
|---|---|---|---|
| X | 100 | 250 | Save |
| X | 251 | 1000 | Master |
| X | 1001 | 1200 | Master |
| Y | 200 | 400 | Master |
| Y | 800 | 2500 | Save |
| D | 1 | 1000 | Save |
| D | 1001 | 1200 | Master |
| ... | ... | ... | ... |

Register    Cancel

FIG.5A

DEVICE MONITOR

Designate device, starting number, and finishing number

| Device | | Starting number | Finishing number | |
|---|---|---|---|---|
| X | ▼ | 100 | 150 | ▼ |
| D | ▼ | 50 | 100 | = |
| ... | | ... | ... | ▲ |

Send   Cancel

FIG.5B

DEVICE MONITOR

Monitor results are as follows

| Device | Starting number | Finishing number |
|--------|-----------------|------------------|
| X      | 100             | 150              |
| D      | 50              | 100              |

| | |
|------|---|
| X100 | 1 |
| X101 | 1 |
| X102 | 0 |
| X103 | 0 |
| X104 | 0 |
| X105 | 1 |
| X106 | 0 |
| X107 | 1 |
| X108 | 1 |
| X109 | 1 |

| | |
|-----|-------|
| D50 | 5823  |
| D51 | 29452 |
| D52 | 58902 |
| D53 | 438   |
| D54 | 24857 |
| D55 | 5207  |
| D56 | 323   |
| D57 | 5753  |
| D58 | 23523 |
| D59 | 6354  |

[Save] [Close]

PROGRAMMABLE LOGIC CONTROLLER, EXTERNAL APPARATUS, METHOD, AND RECORDING MEDIUM

CROSS-REFERENCE TO RELATED APPLICATION

The present application is based on PCT filing PCT/JP2018/038262, filed Oct. 15, 2018, the entire contents of which are incorporated herein by reference.

TECHNICAL FIELD

The present disclosure relates to a programmable logic controller, an external apparatus, a method, and a program.

BACKGROUND ART

A central processing unit (CPU) unit of a programmable logic controller, in order to control the control target device, executes each command of a program at each scan time, performs processing using an input signal supplied from a detector, and supplies to a control target device an output signal that is a result of the processing. An inputter of the programmable logic controller inputs, to the CPU unit of the programmable logic controller, the input signal supplied from the detector connected to the inputter. An outputter of the programmable logic controller supplies, to the control target device connected to the outputter, the output signal output by the CPU unit. In the CPU unit of the programmable logic controller, the input signal supplied from the detector and the output signal that is the result of the processing are stored in a memory area of the CPU unit that is called a device memory.

A user monitors data in the device memory via an external device such as a programmable device or a program development tool, for example, in order to confirm whether operation of a program of the programmable logic controller is normal. Patent Literature 1 discloses a programmable that (i) reads a device value from a device memory at each scan time, that is, at a timing of an input/output (I/O) refresh, and (ii) displays the read device value on a display.

Here, the term "I/O refresh" means an act of exchanging data of the device memory all together between the programmable logic controller, the inputter and the outputter at the end of each scan time. Specifically, exchange of data in the device memory is performed between the CPU unit and the inputter, and exchange of data in the device memory is performed between the CPU unit and the outputter. Since the data stored in the device memory includes data that is rewritten as necessary during the execution of the program, the I/O refresh is executed at the end of the scan time, that is, after all commands are executed.

Also, Patent Literature 2 discloses performance of the I/O refresh not only at the end of the scan time but also after interrupting execution of a program during the execution of the program.

CITATION LIST

Patent Literature

Patent Literature 1: Unexamined Japanese Patent Application Publication No. 2003-84811
Patent Literature 2: Unexamined Japanese Patent Application Publication No. 2016-110458

SUMMARY OF INVENTION

Technical Problem

As disclosed in Patent Literature 1, upon receiving, from a programmable display, a development tool or the like, a read request to read the device memory, a conventional programmable logic controller transmits, to the programmable display, the development tool or the like at the timing of I/O refresh, a value of the device memory designated by the read request as an response to the read request.

The length of scan time varies depending on the programmable logic controller. When the programmable display, the development tool, or the like transmits a read request to the programmable logic controller for which the scan time is set to be long, the programmable logic controller does not transmit a response until the end of the scan time. The programmable display, the development tool or the like is on standby for a long period until a response is received. For this reason, the user cannot operate the programmable display, the development tool or the like that is on standby, which results in a remarkable reduction of the operability of an external device such as the programmable display or the development tool.

In the configuration described in Patent Literature 2, the execution of the program is interrupted and then the I/O refresh is performed. Accordingly, the CPU unit can also transmit a response to the read request to the programmable display, the development tool or the like at the timing at which the execution of the program is interrupted, and then the I/O refresh is performed. In this case, waiting until all commands of the program are executed is unnecessary for the programmable display, the development tool or the like. However, the value read from the device memory in this case is not a value at a time after the commands of the program are completely executed. That is, the value read from the device memory is not data determined by executing the commands of the program completely. Accordingly, even in the configuration disclosed in Patent Literature 2, the determined device value cannot be immediately returned.

In consideration of the aforementioned circumstances, an objective of the present disclosure is (i) to enable an external device for monitoring a device memory to read the determined device value without depending on the scan time of the programmable logic controller and (ii) to improve the operability of the external device.

Solution to Problem

In order to achieve the aforementioned objective, a programmable logic controller performs execution of a program in each set period and repeats the execution of the program. Device storage means stores a device value that is an input value and an output value of the program. Saved data storage means stores the device value stored in the device storage means in a previous period. Upon receiving, from an external device, a read request to read the device value, command processing means (i) reads, in a case in which a reading target preset for a device designated in the read request is the device storage means, the device value stored in the device storage means after execution of the program in a current period is completed, and (ii) immediately reads, in a case in which the reading target preset for the designated device is the saved data storage means, the device value stored in the saved data storage means. Transmission means transmits, to the external device, the device value read by the command processing means.

Advantageous Effects of Invention

In the programmable logic controller of the present disclosure, the saved data storage means stores the device value stored in the device storage means in the previous period. In the case in which the reading target preset for the device designated by the read request received from the external device is the device storage means, the programmable logic controller (i) reads the device value stored in the device storage means after the execution of the program in the current period is completed and (ii) transmits the device value to the external device. In the case in which the reading target preset for the designated device is the saved data storage means, the programmable logic controller (i) immediately reads the device value stored in the saved data storage means and (ii) transmits the device value to the external device. Such a configuration enables the device memory to be read without dependency on the scan time of the programmable logic controller, and the operability of the external device can be improved.

DESCRIPTION OF EMBODIMENTS

A programmable logic controller 1 according to an embodiment of the present disclosure is described below in detail with reference to the drawings.

Embodiment

Figure 1:
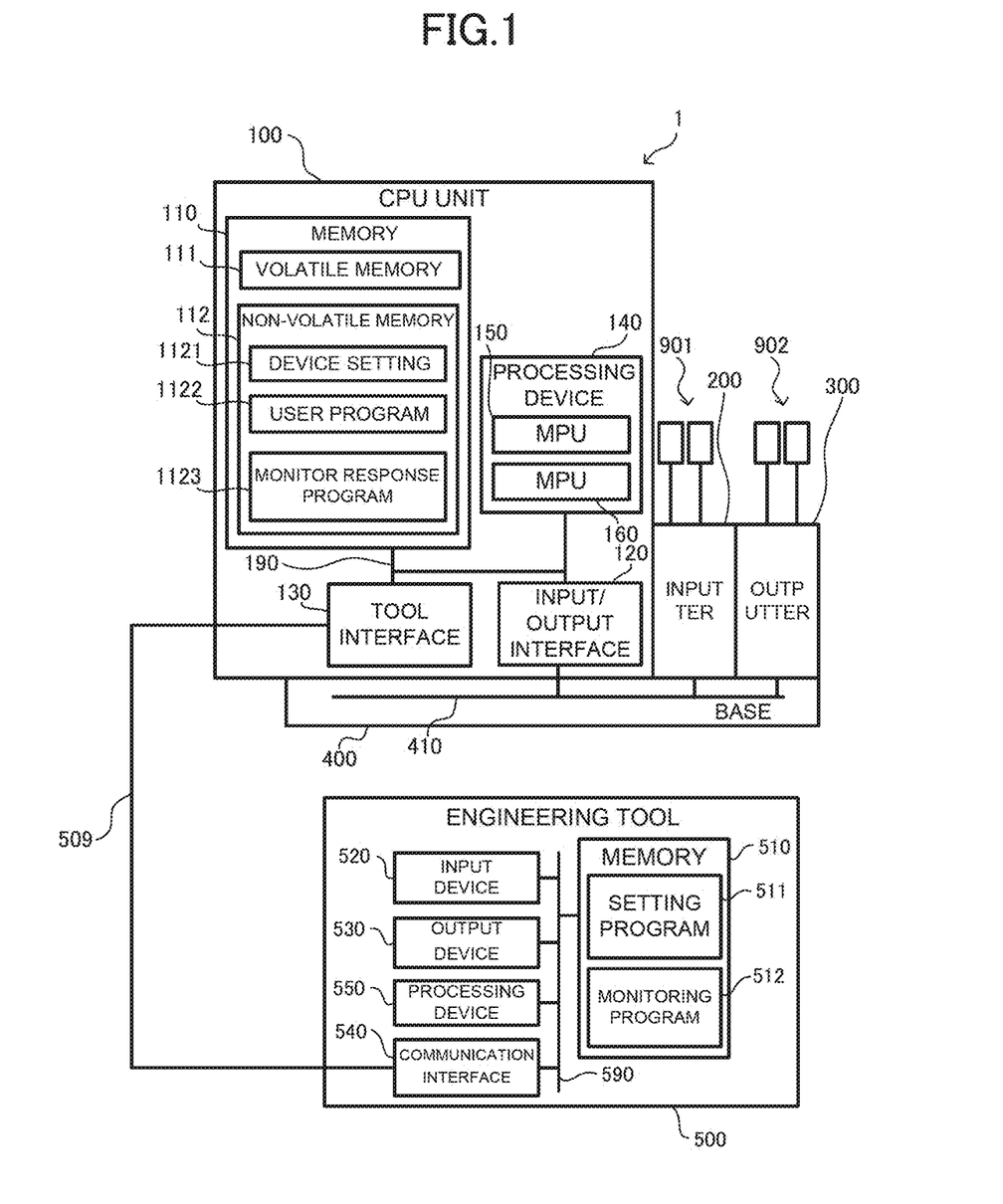
FIG. 1 is a block diagram illustrating a configuration of hardware for a programmable logic controller and an engineering tool according to an embodiment.

The programmable logic controller 1 illustrated in FIG. 1 controls a detector 901 and a controlled device 902 that operate in a production system, a control system or the like. The programmable logic controller 1 includes (i) a central processing unit (CPU) unit 100 that controls the entire programmable logic controller 1, (ii) an inputter 200 that supplies, to the CPU unit 100, an input signal received from the detector 901, (iii) an outputter 300 that outputs, to the controlled device 902, an output signal indicating a processing result by the CPU unit 100, and (iv) a base 400 for mounting the CPU unit, the inputter and the outputter.

The CPU unit 100 (i) executes a command of a program in accordance with an ON/OFF state of an input signal supplied from the inputter 200 and (ii) outputs, to the outputter 300, the processing result represented by the ON/OFF state as an output signal. The CPU unit 100 starts execution of the program at a set period, executes an END command that is the last command of the program, and then ends the execution of the program. The CPU unit 100 starts executing the program again in a next period. This set period is called a scan time.

The detector 901 including a sensor, a switch and the like is connected to the inputter 200. The inputter 200 (i) converts, into a predetermined signal level, the input signal indicating "ON/OFF" and supplied from the detector 901 and (ii) supplies the converted input signal to the CPU unit 100. The controlled device 902 including an actuator, a solenoid valve, an indicator lamp and the like is connected to the outputter 300. The outputter 300 (i) converts, into a predetermined signal level, the output signal indicating "ON/OFF" and supplied from the CPU unit 100 and (ii) supplies the converted output signal to the controlled device 902.

The CPU unit 100, the inputter 200 and the outputter 300 are mounted on the base 400. The CPU unit 100, the inputter 200 and the outputter 300 (i) are connected to a non-illustrated power supply via the base 400 and (ii) are operated by power supplied from the power supply. Also, the CPU unit 100, the inputter 200 and the outputter 300 are connected to one another via a shared bus 410 and communicate with one another via the shared bus 410.

Also, an engineering tool 500 that is a development tool can be connected to the CPU unit 100 of the programmable logic controller 1. The configuration of the engineering tool 500 is described later.

In the following descriptions, the CPU unit 100 having a characteristic configuration in the embodiment is mainly described.

The CPU unit 100 includes, as a configuration of hardware, (i) a memory 110 that stores various types of programs and data, (ii) an input/output interface 120 that communicates with the inputter 200 and the outputter 300, (iii) a tool interface 130 that communicates with the engineering tool 500 described later, and (iv) a processing device 140 that controls the entire CPU unit 100. The memory 110, the input/output interface 120, and the tool interface 130 are connected to the processing device 140 via a bus 190 and communicate with the processing device 140.

The memory 110 (i) includes a volatile memory 111 and a non-volatile memory 112 and (ii) stores various types of programs and data. The volatile memory 111 is used as a working memory of the processing device 140. The non-volatile memory 112 stores (i) a device setting 1121 that stores data about allocation of data stored in the device memory, (ii) a user program 1122 that is executed at each scan time, and (iii) a monitor response program 1123 for responding to a monitor request received from an engineering tool 500 described later. An access speed of the volatile memory 111 is higher than an access speed of the non-volatile memory 112. The user program 1122 is one example of the program of the present disclosure.

Furthermore, the memory 110 achieves the functions of the device memory. The device memory is a memory area that stores (i) the input value of the processing by the user program 1122 that is a value that indicates an input signal supplied from the detector 901 to the CPU unit 100 and (ii) the output value output as the processing result of the user program 1122. The output value output by the processing device 140 executing the user program 1122 is a value indicating an output signal supplied to the controlled device 902. A value indicating the input signal stored in the device memory and a value indicating the output signal stored in the device memory are called device values. The device memory may be simply called a device. In the embodiment, the CPU unit 100 includes (i) a master device memory that stores the device value at the current scan time and (ii) a device memory for saving that stores the device value occurring at the previous scan time. The volatile memory 111 functions as the master device memory. The non-volatile memory 112 functions as the device memory for saving.

The device value includes, for example, time-series data collected from the same sensor or data collected from multiple sensors at the same timing.

The device setting 1121 is data defining an area for storing the input signal, an area for storing the output signal, and the like. The device value and the data of the input signal and the output signal are stored in the area corresponding to a type of data. In the device setting 1121, the area in which the value of the input signal is stored is defined as "X", the area in which the value of the output signal is stored is defined as "Y", and the area in which other values are stored is defined as "D". Further, the device setting 1121 includes a starting number and a finishing number for identifying the size of each of the areas "X", "Y", and "D". Here, the numbers correspond to a so-called memory address. Multiple device values are stored in each of the areas "X", "Y", and "D", and each device value is assigned a number indicating ordering of data in the area. For example, when the starting number of the area "X" is 1, data stored in "X100" is the 100th data in the "X" area. The starting number is a number assigned to the first device value in the area, and the finishing number is a number assigned to the last device value in the area.

The user program 1122 is a program created by a user and is executed by the processing device 140. The processing device 140 executes the user program 1122 to perform processing using the value indicating the input signal supplied from the detector 901.

The monitor response program 1123 is a program for the CPU unit 100 to achieve a function of transmitting, to the engineering tool 500, a monitor response including a designated device value as a response to the monitor request received from the engineering tool 500. The monitor response program 1123 is executed by the processing device 140. Here, the monitor request means a command transmitted by the engineering tool 500 to the CPU unit 100 in order to request reading of the device value. Also, the monitor response means a response that the CPU unit 100 transmits to the engineering tool 500 in response to the monitor request.

The input/output interface 120 is a communication interface for the CPU unit 100 to communicate with the inputter 200 and the outputter 300. The input/output interface 120 (i) converts, into an electric signal, the data supplied from the processing device 140 and (ii) transmits the converted signal to the outputter 300 via the shared bus 410. Also, the input/output interface 120 (i) recovers as data the electric signal received from the inputter 200 and (ii) outputs the data to the processing device 140.

The tool interface 130 is a communication interface for the CPU unit 100 to communicate with an engineering tool 500 described later. The tool interface 130 (i) converts, into an electric signal, the data supplied from the processing device 140 and (ii) transmits the converted signal to the engineering tool 500 via a communication cable 509. Also, the tool interface 130 (i) recovers as data the electric signal received from the engineering tool 500 and (ii) outputs the data to the processing device 140.

The processing device 140 (i) includes micro processors (MPUs) 150 and 160 and (ii) executes various types of programs stored in the memory 110 to achieve various types of functions of the CPU unit 100. As described in detail later, the MPU 150 has a function for receiving the monitor request from the engineering tool 500 and transmitting the monitor response to the engineering tool 500. The MPU 160 has a function for executing the user program 1122 at each scan time.

The engineering tool 500 (i) is a device in which a dedicated application is installed in a personal computer and (ii) is a development tool having a program creation function. In the embodiment, the engineering tool 500 has a function of monitoring the device memory of the CPU unit 100. Accordingly, the user can monitor the device memory of the CPU unit 100 using the engineering tool 500. The engineering tool 500 is one example of the external device of the present disclosure.

The engineering tool 500 includes (i) a memory 510 that stores programs and data, (ii) an input device 520 that detects input operation by the user, (iii) an output device 530 that outputs an image, (iv) a communication interface 540 that communicates with the CPU unit 100, and (v) a processing device 550 that controls the entire engineering tool 500. The components of the engineering tool 500 are connected to one another by a bus 590.

The memory 510 (i) includes a volatile memory and a non-volatile memory and (ii) stores various types of programs and data used when the programs are executed. In the embodiment, the memory 510 stores (i) a setting program 511 for setting a target for reading the device value by the CPU unit 100 and (ii) a monitoring program 512 for monitoring the device value by the CPU unit 100.

The input device 520 includes an input device such as a keyboard or a mouse, detects the input operation by the user, and supplies, to the processing device 550, a signal indicating the detected user's input operation. The output device 530 includes a display and displays, on the display, an image based on the signal supplied from the processing device 550. The communication interface 540 is a communication interface for communicating with the CPU unit 100 via the communication cable 509. The communication interface 540 (i) converts, into an electric signal, the data supplied from the processing device 550 and (ii) transmits the converted signal to the CPU unit 100 via the communication cable 509. Also, the communication interface 540 (i) recovers as data the electric signal received from the CPU unit 100 and (ii) outputs the data to the processing device 550.

The processing device 550 includes a CPU unit and executes various types of programs stored in the memory 110 to achieve various types of functions of the engineering tool 500. In the embodiment, the processing device 550 executes the monitoring program 512, transmits, to the CPU unit 100, a monitor request of the device memory, and displays, on the display of the output device 530, the content of the monitor response received from the CPU unit 100. Also, the processing device 550 (i) executes the setting program 511 and (ii) in response to the monitor request, sets for the CPU unit 100 a target for reading the device value by the CPU unit 100.

Next, functional configuration of the CPU unit 100 is described with reference to FIG. 2. The CPU unit 100 functionally includes (i) a first device storage 101 that stores a device value, (ii) a second device storage 102 that stores saved data of the first device storage 101, (iii) a reading target designation table 103 that designates a reading target for which the device value is to be read, (iv) a command transmission/reception element 104 that transmits and receives a command to and from the engineering tool 500, (v) a command processor 105 that reads the device value from the reading target designated in the reading target designation table 103, (vi) a writing controller 106 that saves the device value of the first device storage 101 in the second device storage 102, and (vii) an executor 107 that executes the user program 1122. The first device storage 101 is one example of the device storage means of the present disclosure. The second device storage 102 is one example of the saved data storage means of the present disclosure. The reading target designation table 103 is one example of setting information storage means of the present disclosure. The command transmission/reception element 104 is one example of the transmission means of the present disclosure. The command processor 105 is one example of the command processing means of the present disclosure. The writing controller 106 is one example of writing control means of the present disclosure.

The first device storage 101 stores the input value and the output value of the user program 1122, that is, device values at the current scan time. The first device storage 101 is a master device memory of the CPU unit 100. The input value of the user program 1122 is written in the first device storage 101 by the I/O refresh. Further, by executing the user program 1122, the output value output by executing the user program 1122 is written in the first device storage 101. The functions of the first device storage 101 are achieved by the volatile memory 111 of the memory 110 illustrated in FIG. 1. This is because the access speed of the volatile memory 111 is higher than that of the non-volatile memory 112.

Figure 2:
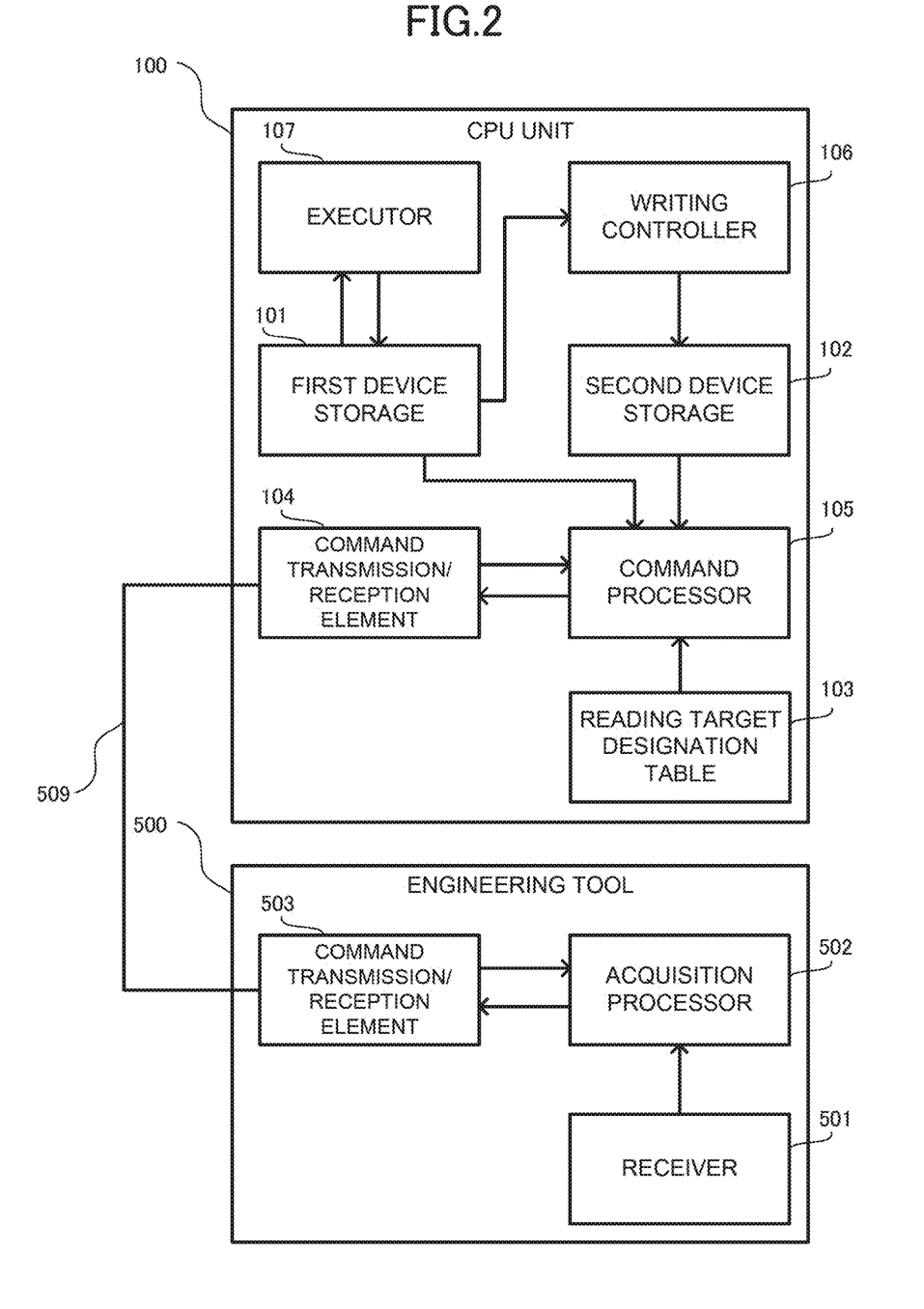
FIG. 2 is a block diagram illustrating functions of a CPU unit of the programmable logic controller and the engineering tool according to the embodiment.

The second device storage 102 illustrated in FIG. 2 stores the data saved from the first device storage 101. More specifically, the second device storage 102 stores the device values stored in the first device storage 101 at the previous scan time, that is, the input value and the output value at the previous scan time. The second device storage 102 is a device memory for saving. The writing controller 106 writes the device values of the first device storage 101 into the second device storage 102. The functions of the second device storage 102 are achieved by the non-volatile memory 112 of the memory 110 illustrated in FIG. 1.

Figure 3:
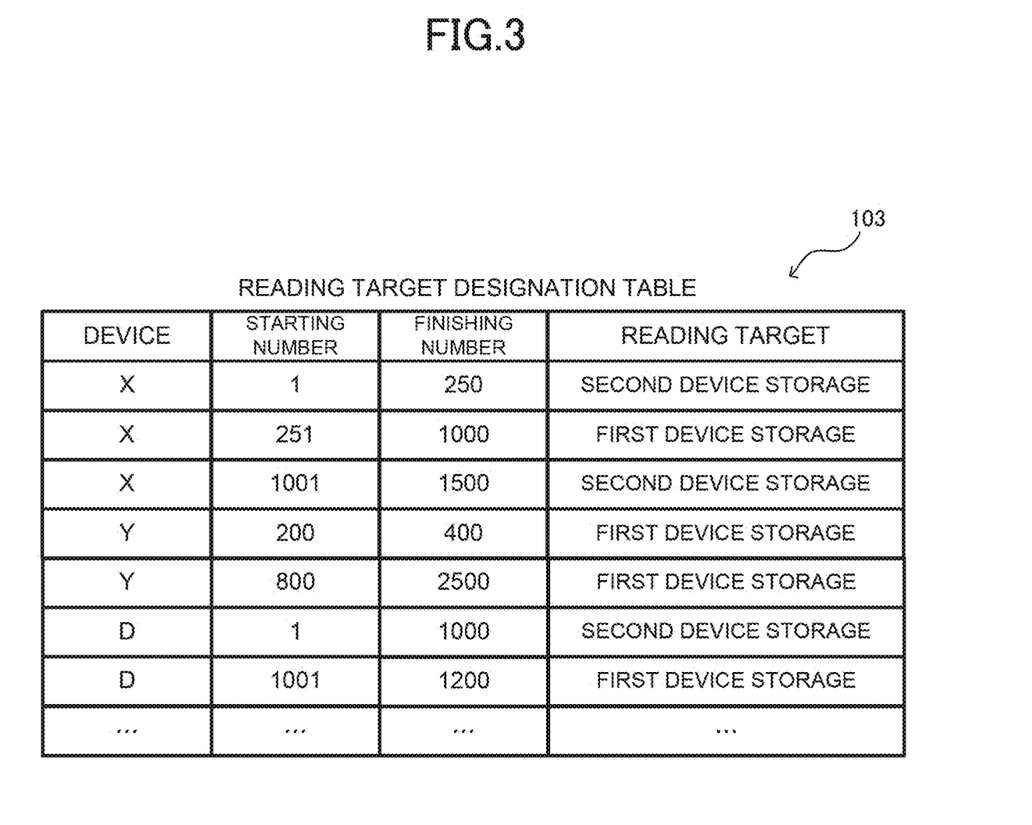
FIG. 3 is a diagram illustrating one example of data registered in a reading target designation table according to the embodiment.

The reading target designation table 103 stores data that designates which of the first device storage 101 and the second device storage 102 the device value designated by the monitor request is acquired from. As illustrated in FIG. 3, in the reading target designation table 103, designation is made as to whether, for a device value of a range identified by device area name, starting number, and finishing number, the reading target is the first device storage 101 or the second device storage 102.

In the illustrated example, the starting number and the finishing number respectively indicate a start point and an end point of the set range of the device. The reading target indicates whether the reading target having the device value in the set range is set to be the first device storage 101 or the second device storage 102. For example, the device values of "X1" to "X250" are designated to be read from the second device storage 102. Here, the device values of "Y200" to "Y400" are also designated to be read from the first device storage 101. In the reading target designation table 103, a reading target can be designated for each designated range. In the embodiment, a default reading target is assumed to be the first device storage 101. Accordingly, device values in a range not set in the reading target designation table 103 are read from the first device storage 101. The functions of the reading target designation table 103 are achieved by the non-volatile memory 112 of the memory 110 illustrated in FIG. 1.

The command transmission/reception element 104 illustrated in FIG. 2 receives a monitor request from the engineering tool 500 and outputs the received monitor request to the command processor 105. Also, the command transmission/reception element 104 transmits, to the engineering tool 500, the monitor response supplied from the command processor 105. The functions of the command transmission/reception element 104 are achieved by the tool interface 130 and the MPU 150 of FIG. 1.

The command processor 105 illustrated in FIG. 2 (i) reads, from the read target designated in the reading target designation table 103, the device value designated in the monitor request and (ii) outputs, to the command transmission/reception element 104, the monitor response including the read device value. The monitoring request transmitted by the engineering tool 500 includes (i) a value that identifies an area of the device, and (ii) the starting number and the finishing number that indicate a range of a monitoring target. Also, the monitor response includes the device values read in an order designated by the monitor request. For example, device values of the starting number "100" to the finishing number "150" of a device "X" and device values of the starting number "50" to the finishing number "100" of a device "D" are assumed to be requested by the monitor request. In this case, the monitor response stores the device values of "X100" to "X250" and the device values of "D50" to "D100" with these device values arranged in such order.

The engineering tool 500 is assumed to request the CPU unit 100 to read the 100th to 150th device values of the device "X" by a monitor request. In this case, the command processor 105 determines, from the reading target designation table 103 of FIG. 3, that the reading target having the device values of "X100" to "X150" is the second device storage 102. Also, reading of the 1001st to 1200th device values of a device "Y" are assumed to be requested by the monitor request. In this case, the command processor 105 determines, from the reading target designation table 103, that the reading target having the device values "Y1001" to "Y1200" is the first device storage 101. Upon request to read a device value for which a reading target is not set in the reading target designation table 103, the command processor 105 determines that the reading target having such a device value is the first device storage 101 that is the default reading target.

When the first device storage 101 is designated as the reading target of the device value designated by the monitor request in the reading target designation table 103, the command processor 105 executes reading of the device value as follows. The command processor 105 (i) reads, from the first device storage 101, the device value designated by the monitor request after the executor 107 executes the END command of the user program 1122, and (ii) outputs the read device value to the command transmission/reception element 104.

When the second device storage 102 is designated as the reading target of the device value designated by the monitor request in the reading target designation table 103, the command processor 105 executes reading of the device value as follows. The command processor 105 (i) immediately reads, from the second device storage 102, the device value designated by the monitor request and (ii) outputs the read device value to the command transmission/reception element 104. In the embodiment, the MPU 160 reads the device value from the first device storage 101, and the MPU 150 reads the device value from the second device storage 102. The functions of the command processor 105 are achieved by the MPU 150 and MPU 160 of FIG. 1.

Further, upon receiving a command providing instruction to update the reading target designation table 103 from the engineering tool 500, the command processor 105 registers data in the reading target designation table 103 based on (i) the value for identifying the area of the device, (ii) the starting number and the finishing number indicating the range of a monitor target of the area and (iii) the value for identifying the designated reading target that are included in the command. For example, when receiving, from the engineering tool 500, a command providing instruction to set the reading targets of No. 100 to No. 250 of "X" to be slaves, the command processor 105 records, in the reading target designation table 103 illustrated in FIG. 3, data "device: X, starting number: 1, finishing number 250, read target: second device storage".

When the writing controller 106 illustrated in FIG. 2 receives, from the executor 107, notification that the END command of the user program 1122 is executed, the device value of the first device storage 101 is copied in the second device storage 102. Although the device value of the first device storage 101 is overwritten by execution of the user program 1122 at the next scan time, the second device storage 102 stores the device value occurring at the previous scan time. In other words, the device value of the first device storage 101 is saved in the second device storage 102. The functions of the writing controller 106 are achieved by the MPU 160 in FIG. 1.

The executor 107 illustrated in FIG. 2 executes the user program 1122 at each scan time. Specifically, the executor 107 (i) executes each command of the user program 1122 in accordance with the input signal stored in the first device storage 101 and (ii) stores a processing result in the first device storage 101. After executing the END command that is the last command of the user program 1122, the executor 107 notifies the writing controller 106 that one scan is completed. In response to this notification, the writing controller 106 copies the device value of the first device storage 101 to the second device storage 102. Afterward, the executor 107 performs the I/O refresh to exchange, all at once, the device values of the first device storage 101 with those of the inputter 200 and the outputter 300. The functions of the executor 107 are achieved by the MPU 160 of FIG. 1.

As illustrated in FIG. 2, the engineering tool 500 functionally includes (i) a receiver 501 that receives instruction regarding reading of a device value, (ii) an acquisition processor 502 that acquires the device value from the CPU unit 100, (iii) a command transmission/reception element 503 that transmits and receives the command to and from the CPU unit 100. The receiver 501 is one example of reception means of the present disclosure. The acquisition processor 502 is one example of acquisition processing means of the present disclosure.

Figure 4:
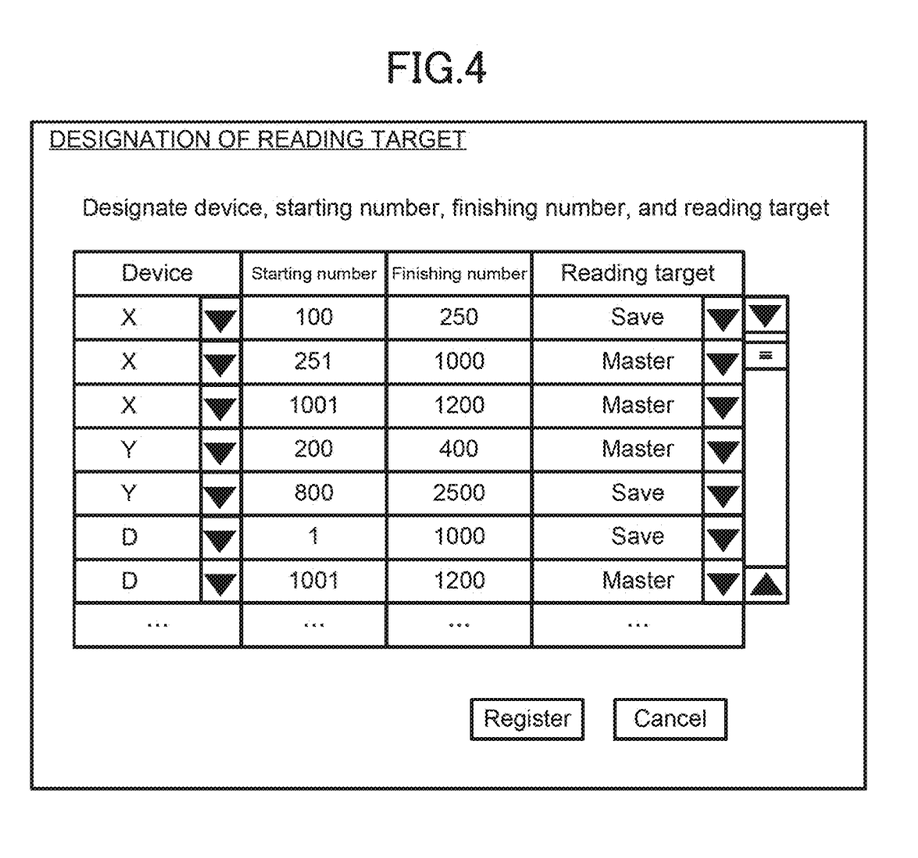
FIG. 4 is a diagram illustrating one example of a designation screen for reading of the engineering tool according to the embodiment.

The receiver 501 receives from a user the instruction regarding the reading of a device value. Specifically, the receiver 501 receives, from the user, instruction as to whether reading target of the device value is designated as the master or the save target. For example, the receiver 501 (i) displays, on the output device 530, a screen as illustrated in FIG. 4 and (ii) receives, from the user, instruction regarding designation of the reading target. In this case, the receiver 501 receives, from the user, designation of the area of the device, designation of a range in the area, and designation of the reading target. The acquisition processor 502, which is described later, transmits, to the CPU unit 100 via the command transmission/reception element 503, a command providing instruction to update the reading target designation table 103, in accordance with the content input by the user on the screen illustrated in FIG. 4.

Figure 5A:
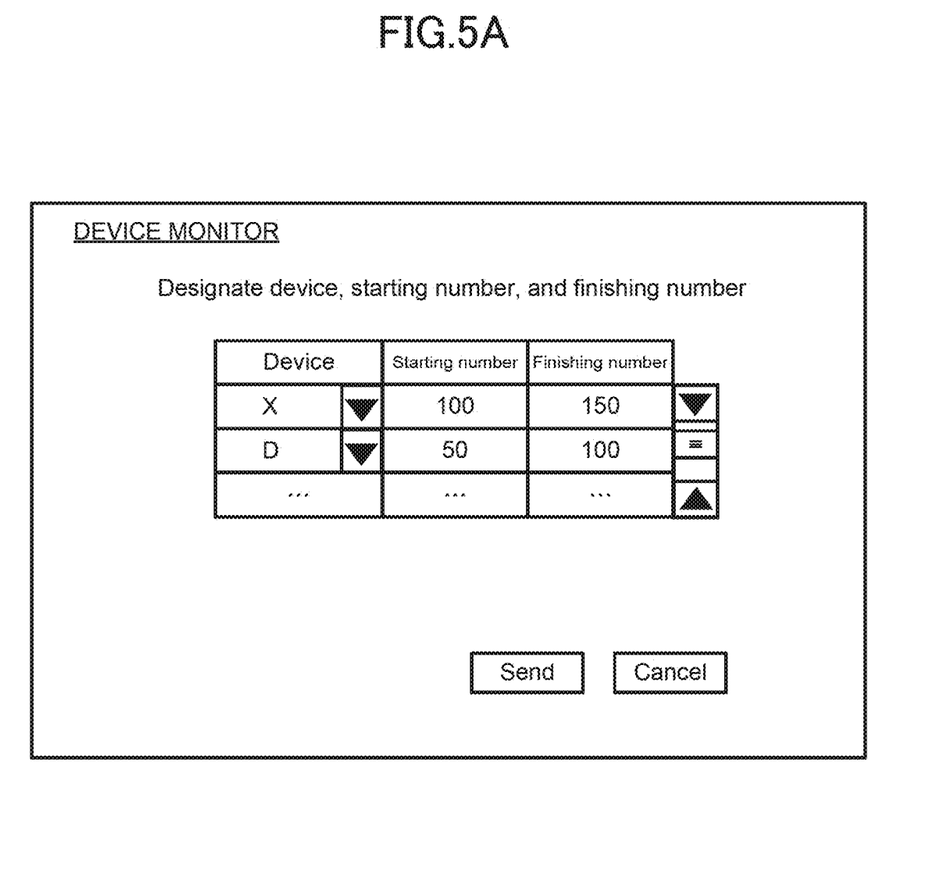
FIG. 5A is a diagram illustrating one example of an input screen of a device monitor of the engineering tool according to the embodiment.

Further, the receiver 501 receives, from the user, instruction to read the designated device value. For example, the receiver 501 (i) displays, on the output device 530, a screen as illustrated in FIG. 5A and (ii) receives, from the user, instruction regarding reading of the device value. In this case, the receiver 501 receives, from the user, the designation of the area of the device and the designation of the range in the area. The acquisition processor 502, which is described later, transmits the monitor request to the CPU unit 100 via the command transmission/reception element 503 in accordance with the content input by the user on the screen illustrated in FIG. 5A.

The acquisition processor 502 illustrated in FIG. 2 transmits, to the CPU unit 100, a command depending on the user's instruction received by the receiver 501. Specifically, the acquisition processor 502 transmits, to the CPU unit 100 via the command transmission/reception element 503, a command providing instruction to update the reading target designation table 103 in accordance with the instruction that the receiver 501 receives from the user for the designation of the reading target. The command includes a value that identifies the area of the device, the starting number and the finishing number that indicate the range of the monitoring target in the area, and a value that identifies the specified read target.

Further, the acquisition processor 502 (i) generates a monitor request for requesting reading of the designated device value in accordance with the instruction to read the device, the instruction being received by the receiver 501 from the user, and (ii) outputs the monitor request to the command transmission/reception element 503. The monitor request includes (i) the value that identifies the area of the device and (ii) the starting number and the finishing number that indicate the range of the monitoring target in the area.

Figure 5B:
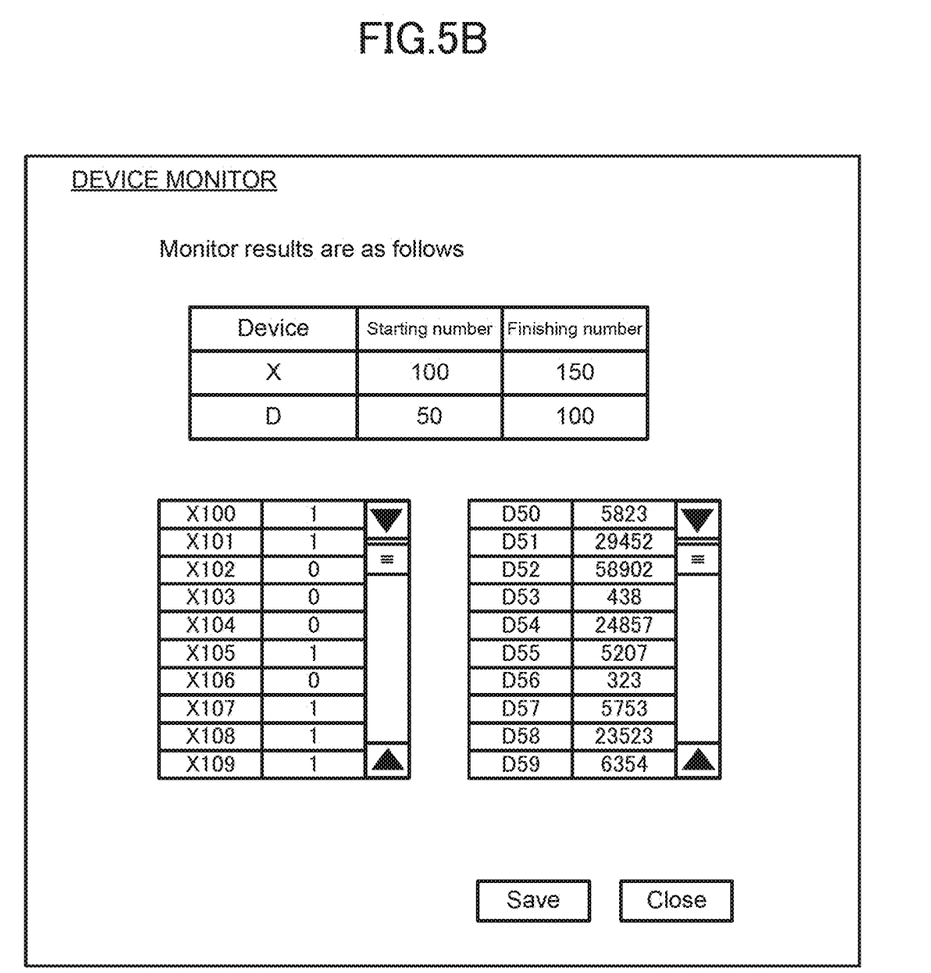
FIG. 5B is a diagram illustrating one example of an execution result screen of the device monitor of the engineering tool according to the embodiment.

Also, the acquisition processor 502 (i) acquires the device value that is included in the monitor response received from the CPU unit 100 by the command transmission/reception element 503 and (ii) stores the device value in the memory 510 illustrated in FIG. 1. As described above, the monitor response includes the device values that are read in the order designated by the monitor request. Furthermore, the acquisition processor 502 may display, on the output device 530, a screen displaying the device values included in the monitor request, as illustrated in FIG. 5B. The above-described functions of the acquisition processor 502 are achieved by the processing device 550 of FIG. 1 executing the monitoring program 512 and the setting program 511.

The command transmission/reception element 503 illustrated in FIG. 2 transmits, to the CPU unit 100, a command that is output from the acquisition processor 502 and that provides instruction to update the reading target designation table 103. Furthermore, the command transmission/reception element 503 transmits, to the CPU unit 100, the monitor request output from the acquisition processor 502. Also, the command transmission/reception element 503 also outputs, to the acquisition processor 502, the monitor response received from the CPU unit 100. The functions of the command transmission/reception element 503 are achieved by the communication interface 540 and the processing device 550 of FIG. 1.

As described above, the reading target having the device value designated by the monitor request is designated in the reading target designation table 103. Accordingly, prior to monitoring of the device, data designating a reading target having the device value is to be registered in the reading target designation table 103.

Hereinafter, a method is described in which the user uses the engineering tool 500 to register the data for designating a reading target in the reading target designation table 103 of the CPU unit 100. As illustrated in FIG. 1, the user operates the input device 520 such as a keyboard or a mouse in a state in which the engineering tool 500 and the CPU unit 100 are connected to each other via the communication cable 509, to launch the setting program 511. The processing device 550 executes the setting program 511 in response to the user's operation and achieves the following functions.

The processing device 550 requests that the CPU unit 100 provide the data of the device setting 1121. The CPU unit 100 is assumed to transmit the data of the device setting 1121 to the engineering tool 500 in response to this request. The device name "X" indicating the area in which the value of the input signal is stored, the device name "Y" indicating the area in which the value of the output signal is stored, the device name "D" indicating the area in which other values are stored, and the starting number and the finishing number indicating the size of each area are assumed to be transmitted as the data of the device setting 1121.

The processing device 550 displays such a designation screen for the reading target as illustrated in FIG. 4 on the output device 530 based on data of the device setting 1121 provided from the CPU unit 100. The user can operate the input device 520 such as a keyboard or a mouse via the screen illustrated in the drawing to freely select a device from "X", "Y", and "D". Also, the user can enter a starting number and a finishing number for designating the range in each device. The user can select "master" or "save" as the reading target. Here, the term "master" indicates the first device storage 101, and the term "save" indicates the second device storage 102.

The user is assumed to finish the input operation and press the "register" button. Accordingly, the processing device 550 transmits, to the CPU unit 100, the command providing instruction to update the reading target designation table 103. The command includes data indicating the content of an update input by the user. In response to this command, the CPU unit 100 updates the reading target designation table 103 based on the received data. The user can use the engineering tool 500 to update the data in the reading target designation table 103 as needed. Upon updating the data of the reading target designation table 103, the CPU unit 100 reads the device value from the reading target designated by the updated reading target designation table 103.

Next, a method used by the user for monitoring the device value of the CPU unit 100 using the engineering tool 500 is described. As illustrated in FIG. 1, the user operates the input device 520 such as a keyboard or a mouse in a state where the engineering tool 500 and the CPU unit 100 are connected to each other via the communication cable 509, to launch the monitoring program 512. The processing device 550 executes the monitoring program 512 in response to the user's operation and achieves the following functions.

The processing device 550 displays, on the output device 530, the input screen of the device monitor as illustrated in FIG. 5A. The user is assumed (i) to operate the input device 520 such as a keyboard or a mouse on the screen illustrated in the drawing to input a device to be monitored and the starting number and the finishing number indicating the range and (ii) to press the "send" button. Accordingly, the processing device 550 transmits, to the CPU unit 100, a monitor request including the designated device and the starting number and the finishing number. In response to this request, the CPU unit 100 reads the device value designated by the monitor request and transmits, to the engineering tool 500, a monitor response including the read device value.

Upon receiving the monitor response from the CPU unit 100, the processing device 550 displays on the output device 530 an output screen on the device monitor as illustrated in FIG. 5B. In the illustrated example, the processing device 550 also displays a number indicating which data each device value corresponds to. For example, the CPU unit 100 (i) reads the device values of "X100" to "X150" in a designated order and (ii) transmits the read device values to the engineering tool 500. The processing device 550 displays not only the device value received from the CPU unit 100 but also a device number indicating, based on the starting number and the finishing number input by the user, which order-numbering of data each device value corresponds to in the area "X".

Next, processing (monitor response process) is described in which the CPU unit 100 returns a monitor response to the engineering tool 500 when receiving the monitor request from the engineering tool 500. The following processing is achieved by the MPU 150 executing the monitor response program 1123 illustrated in FIG. 1. On the other hand, the MPU 160 is assumed to execute the user program 1122 at each scan time.

Figure 6:
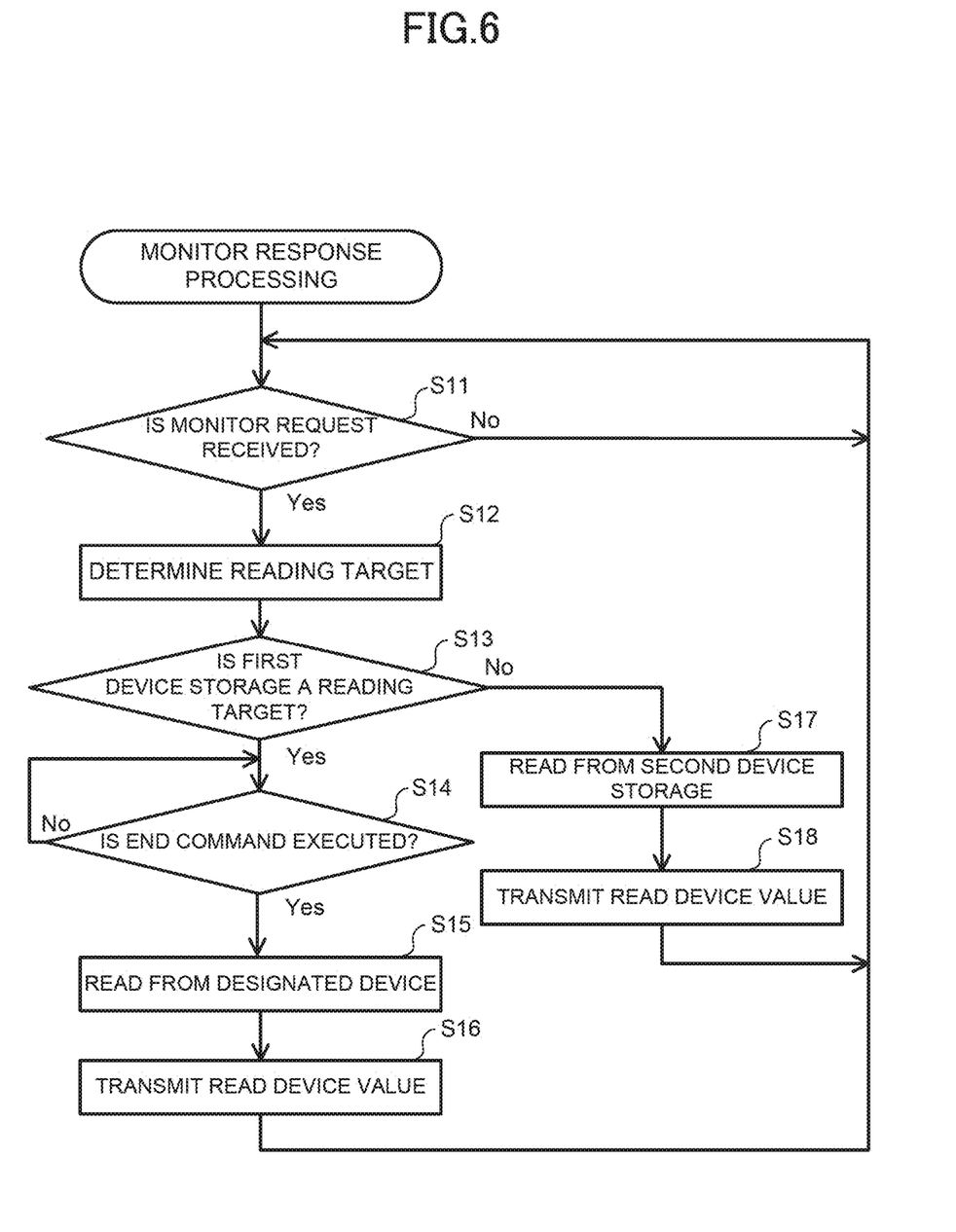
FIG. 6 is a flowchart illustrating monitor response processing performed by the CPU unit according to the embodiment.

As illustrated in FIG. 6, the MPU 150 determines whether a monitor request is received from the engineering tool 500 (step S11). Upon determining that the monitor request is received (Yes in step S11), the MPU 150 determines, based on the reading target designation table 103, a reading target of the device value designated by the monitor request (step S12). On the other hand, if the monitor request is not received from the engineering tool 500 (No in step S11), the MPU 150 executes the process of step S11 again after the MPU 150 stands by for a certain period of time.

Upon determining that the reading targets include the first device storage 101 (Yes in step S13;), after the MPU 160 executes the END command of the user program 1122 (Yes in step S14), the MPU 150 and MPU 160 cooperate with each other to read the designated device value (step S15).

Specifically, in step S13, the MPU 150 requests that the MPU 160 read the device value for which the first device storage 101 is designated as the reading target in the reading target designation table 103. After executing the END command, the MPU 160 determines whether a read request is received from the MPU 160. Upon determining that the read request is received from the MPU 150 after executing the END command in step S14, the MPU 160 reads the designated device value from the first device storage 101 in step S15. The MPU 160 transmits, to the MPU 150, the device value read from the first device storage 101.

Also, the MPU 150 reads, from the second device storage 102, a device value for which the second device storage 102 is designated as the reading target in the reading target designation table 103. When the reading target is only the first device storage 101, the MPU 150 does not need to read the device value from the second device storage 102.

The MPU 150 transmits the device value to the engineering tool 500 (step S16). When both the first device storage 101 and the second device storage 102 are the reading target, the MPU 150 transmits, to the engineering tool 500, the device value of the first device storage 101 received from the MPU 160 and the device value of the second device storage 102 read by the MPU 150. When only the first device storage 101 is the reading target, the MPU 150 transmits, to the engineering tool 500, the device value of the first device storage 101 received from the MPU 160.

On the other hand, upon determining, in step S13, that the reading target does not include the first device storage 101 (No in step S13), that is, when only the second device storage 102 is the reading target, the MPU 150 (i) reads a device value designated from the second device storage 102 (step S17) and (ii) transmits the read device value to the engineering tool 500 (step S18). Specifically, the MPU 150 transmits, to the engineering tool 500, a response command including the read device value.

As described above, in the embodiment, when the device value requested by the engineering tool 500 is designated to be read from the second device storage 102 in the reading target designation table 103, the CPU unit 100 immediately returns, to the engineering tool 500, the device value stored in the second device storage 102. Accordingly, the device value for which the user designates the second device storage 102 as a reading target can be read without depending on the scan time of the CPU unit 100. There is no case in which the engineering tool 500 is made to wait for a long time until reception of the monitor response. As a result, the operability of the engineering tool 500 is improved.

On the other hand, when the device value requested by the engineering tool 500 is designated to be read from the first device storage 101 in the reading target designation table 103, the CPU unit 100 returns the device value stored in the first device storage 101 to the engineering tool 500 at each scan time as in the conventional case.

As for the device value that does not change during the execution of the user program, designation of the second device storage 102 as a reading target avoids need for the user to wait for a long time for the purpose of monitoring the device value. In such a case, the configuration according to the embodiment is particularly effective.

Alternatively, when devices of multiple CPU units 100 are monitored, the second device storage 102 can be also set to be a reading target concerning the CPU unit 100 having a long scan time, and the first device storage 101 can be also set to be a reading target concerning the CPU unit 100 having a short scan time.

In step S13 of FIG. 6, when both the first device storage 101 and the second device storage 102 are the reading target, the device values are returned to the engineering tool 500 at each scan time. Accordingly, the response of the device value of the second device storage 102 also becomes slow. For example, occurrence of such a situation can be prevented by the following method. The memory 510 of the engineering tool 500 stores beforehand data having the same content as the content registered in the reading target designation table 103 of the CPU unit 100. For example, when both the first device storage 101 and the second device storage 102 are included in reading targets of the device values designated by the user in the input screen of the device monitor illustrated in FIG. 5A, the processing device 550 may be configured to display, on the screen, a message warning that the response becomes slow.

Modified Example 1

In the above-described embodiment, although the example is described in which a reading target having a device value is preset in the reading target designation table 103 of the CPU unit 100, the designation method of the reading target is not limited to such configuration.

Figure 7:
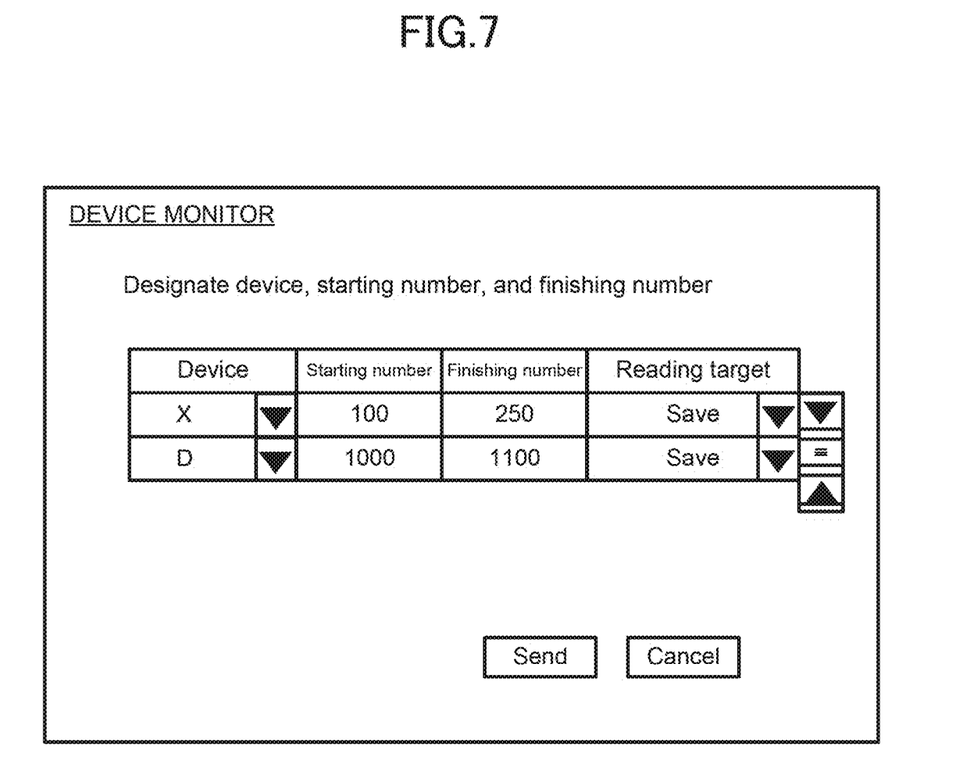
FIG. 7 is a diagram illustrating one example of an input screen of a device monitor of an engineering tool according to a modified example 1.

The engineering tool 500 may transmit, to the CPU unit 100, a monitor request including information that designates the reading target. The receiver 501 receives, from the user, designation of an area of a device to be read, designation of a range in the area, and designation of the reading target. For example, the receiver 501 may be configured to be capable of designating the reading target on the input screen of the device monitor as illustrated in FIG. 7.

In this case, the acquisition processor 502 illustrated in FIG. 2 (i) generates a monitor request depending on a user's instruction received by the receiver 501 and (ii) transmits the generated monitor request to the CPU unit 100 via the command transmission/reception element 503. The monitor request includes (i) a value that identifies an area of a device, (ii) a starting number and a finishing number that indicate a range of a monitoring target in the area, and (iii) a value that identifies a designated reading target. The CPU unit 100 (i) reads the designated device value from the reading target designated by the monitor request and (ii) transmits, to the engineering tool 500, a monitor response including the read device value. In the case of the above-described configuration, there is no need to register the reading target in the reading target designation table 103.

Also in the configuration according to Modified Example 1, as in the embodiment, the device value for which the user designates the second device storage 102 as the reading target is immediately returned from the CPU unit 100 to the engineering tool 500, thereby improving the operability of an external device.

Modified Example 2

In the embodiment, the CPU unit 100 includes two MPUs 150 and 160, the MPU 150 executes the processing related to the monitor response, and the MPU 160 executes the user program 1122. In this case, since the processing is performed by the two MPUs in a distributed manner, processing load on each MPU can be suppressed. However, the CPU unit 100 may not include two MPUs.

Figure 8:
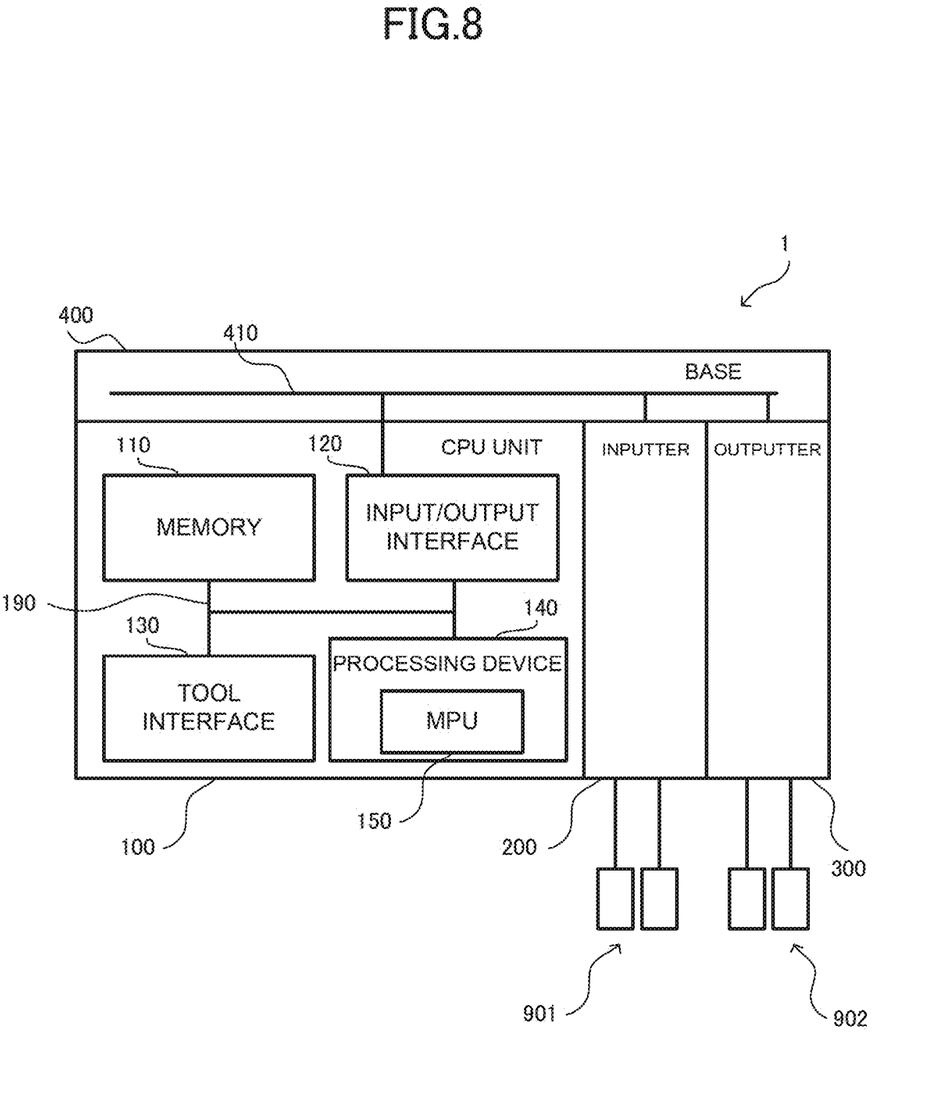
FIG. 8 is a diagram illustrating a configuration of hardware for a programmable logic controller according to a modified example 2.

As illustrated in FIG. 8, the CPU unit 100 may include only one MPU 150. Since the CPU unit 100 includes only one MPU, cost can be reduced in comparison to the case in which the CPU unit 100 includes two MPUs. In this case, the MPU 150 achieves the functions of both the command processor 105 and the writing controller 106 illustrated in FIG. 2.

Modified Example 3

In the embodiment, as illustrated in FIG. 1, the example is described in which the first device storage 101 is achieved by the volatile memory 111 and the second device storage 102 is achieved by the non-volatile memory 112. In this case, for example, when power supply to the CPU unit 100 is cut off due to a blackout, the embodiment has the following advantage.

When the power supply to the CPU unit 100 is cut off due to the blackout, the data stored in the first device storage 101 is not saved. However, the data stored in the second device storage 102 is saved. In this case, the executor 107 illustrated in FIG. 2 has only to execute the user program 1122 using the device value stored in the second device storage 102. Since the second device storage 102 stores the device value at the scan time completed before occurrence of the blackout, such configuration is advantageous in that the controlled device 902 can be restored from the intermediate process.

Alternatively, in the case of slow access speed of the second device storage 102, the writing controller 106 may copy, to the first device storage 101, the device value stored in the second device storage 102. Since the data is copied between memories in the same CPU unit 100, such data transfer does not require much time. Afterward, the executor 107 executes the user program 1122 using the device value stored in the first device storage 101, thereby achieving a desired result. Since the device value at the scan time completed before the occurrence of the blackout occurs is copied to the first device storage 101, this case is advantageous in that the controlled device 902 can be restored from the intermediate process.

Also, in the embodiments, the command processor 105 reads the device value from the default reading target when the reading target is not designated in the reading target designation table 103. The provision of such a configuration is advantageous as follows. For example, when the first device storage 101 is the default reading target, there is no need to register, in the reading target designation table 103, a device value for which the reading target is the first device storage 101. The user has only to only designate, in the reading target designation table 103, (i) a device specifying the second device storage 102 as the read target and (ii) the range of such.

In the embodiment, the example is described in which all device values of the first device storage 101 are copied to the second device storage 102, without particular limitation. Among the device values of the first device storage 101, configuration may be used in which only a device value in a designated range is copied to the second device storage 102.

In the embodiment, the example is described in which the second device storage 102 is achieved by the non-volatile memory 112. However, the second device storage 102 may be achieved by a volatile memory. Also in this case, the CPU unit 100 immediately returns, to the engineering tool 500, a designated device value for which the reading target is the second device storage 102. Accordingly, the operability of the external device can be improved. Also, the first device storage 101 may be achieved by a non-volatile memory instead of a volatile memory if a sufficient access speed is guaranteed for the first device storage 101. In this case, even if the power supply to the CPU unit 100 is cut off, the device value of the first device storage 101 is saved.

In the embodiment, the engineering tool 500 is described as an example of the external device for monitoring the device memory. However, the external device may be a programmable display or another information processing device capable of communicating with the CPU unit 100.

As the recording medium in which the program is recorded, a computer-readable recording medium such as a magnetic disk, an optical disc, a magneto-optical disc, a flash memory, a semiconductor memory, or a magnetic tape can be used.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Programmable logic controller
100 CPU unit
101 First device storage
102 Second device storage
103 Reading target designation table
104, 503 Command transmission/reception element
105 Command processor
106 Writing controller
107 Executor
110, 510 Memory
111 Volatile memory
112 Non-volatile memory
120 Input/output interface
130 Tool interface
140, 550 Processing device
150, 160 MPU
190, 590 Bus
200 Inputter
300 Outputter
400 Base
410 Shared bus
500 Engineering tool
501 Receiver
502 Acquisition processor
509 Communication cable
511 Setting program
512 Monitoring program
520 Input device
530 Output device
540 Communication interface
901 Detector
902 Controlled device
1121 Device setting
1122 User program
1123 Monitor response program

The invention claimed is:

1. A programmable logic controller to perform execution of a program in each set period and repeat the execution of the program; the programmable logic controller comprising:
   a device storage to store a device value that is an input value and an output value of the program;
   a saved data storage to store the device value stored in the device storage in a previous period;
   a command processor to, upon receiving, from an external device, a read request to read the device value,
      read, in a case in which a reading target preset for a device designated by the external device in the read request is the device storage, the device value stored in the device storage after execution of the program in a current period is completed, and
      immediately read, in a case in which the reading target preset for the device designated by the external device is the saved data storage; the device value stored in the saved data storage; and
   a transmitter to transmit, to the external device, the device value read by the command processor.

2. The programmable logic controller according to claim 1, further comprising:
   a writing controller to write, to the saved data storage, the device value stored in the device storage.

3. The programmable logic controller according to claim 2, wherein when execution of the program in the previous period is completed, the writing controller writes, to the saved data storage, the determined device value that is stored in the device storage.

4. The programmable logic controller according to claim 3, wherein when the programmable logic controller executes a last command of the program, execution of the program in the current period is completed, and the determined device value that is stored in the device storage when the execution of the program in the previous period is completed is the device value that is stored in the device storage after the programmable logic controller executes the last command of the program in the previous period.

5. The programmable logic controller according to claim 1, wherein the read request includes information designating a storage that is to be the reading target among the device storage and the saved data storage, and the command processing determines, as the reading target, the storage designated by the read request.

6. The programmable logic controller according to claim 1, further comprising:

a setting information storage to designate, as the reading target preset for the device value, the device storage or the saved data storage, wherein for the device value designated by the read request, the command processor determines, as the reading target, a storage designated by the setting information storage.

7. The programmable logic controller according to claim 6, wherein the setting information storage designates the reading target of the device value for each of designated ranges.

8. The programmable logic controller according to claim 1, wherein the saved data storage comprises a non-volatile memory.

9. An external device to connect to the programmable logic controller according to claim 1 and read the device value, the external device comprising:

a receiver to receive instruction regarding reading of the device value; and an acquisition processor to transmit, to the programmable logic controller, a command according to the instruction received by the receiver, wherein the acquisition processor when the receiver receives an instruction to designate, concerning the designated device value, the device storage as the reading target, transmits, to the programmable logic controller, a command indicating the instruction to designate, concerning the designated device, the device storage as the reading target, when the receiver receives an instruction to designate, concerning the designated device value, the saved data storage as the reading target, transmits, to the programmable logic controller, a command indicating the instruction to designate the saved data storage as the reading target, and receives, from the programmable logic controller, the device value as a response to the read request.

10. A method performed by a programmable logic controller performing execution of a program in each set period and repeating the execution of the program, the method comprising:

in a case in which a device value in a current period is set as a reading target regarding a device designated by an external device in a read request to read the device value received from the external device, transmitting the device value to the external device after execution of the program in the current period is completed, and in a case in which a device value in a previous period is set as a reading target regarding the device designated by the external device, immediately transmitting, to the external device, the device value in the previous period.

11. A non-transitory computer-readable recording medium storing a program for a programmable logic controller to perform execution of the program in each set period and repeat the execution of the program, the program causing the programmable logic controller to:

store, in a device storage, a device value that is an input value and an output value of the program;

store, in a saved data storage, the device value stored in the device storage in a previous period;

for a device designated by an external device in a read request to read the device value received from the external device, read the device value from a reading target that is preset from among the device storage and the saved data storage; and transmit, to the external device, the device value.

* * * * *